US010084849B1

United States Patent
Segal

(10) Patent No.: US 10,084,849 B1
(45) Date of Patent: Sep. 25, 2018

(54) SYSTEM AND METHOD FOR PROVIDING AND INTERACTING WITH COORDINATED PRESENTATIONS

(71) Applicant: Touchcast LLC, New York, NY (US)

(72) Inventor: Edo Segal, New York, NY (US)

(73) Assignee: TOUCHCAST LLC, New York, NY (US)

( * ) Notice: Subject to any disclaimer, the term of this patent is extended or adjusted under 35 U.S.C. 154(b) by 102 days.

(21) Appl. No.: 15/002,295

(22) Filed: Jan. 20, 2016

Related U.S. Application Data

(63) Continuation-in-part of application No. 14/833,984, filed on Aug. 24, 2015, now Pat. No. 9,661,256, which is a continuation-in-part of application No. 14/316,536, filed on Jun. 26, 2014, now Pat. No. 9,363,448, which is a continuation-in-part of application No. 13/938,955, filed on Jul. 10, 2013, now Pat. No. 9,036,043.

(60) Provisional application No. 62/105,682, filed on Jan. 20, 2015, provisional application No. 62/242,029, filed on Oct. 15, 2015, provisional application No. 62/209,727, filed on Aug. 25, 2015.

(51) Int. Cl.
  *H04L 29/08* (2006.01)
  *G06F 3/0484* (2013.01)

(52) U.S. Cl.
  CPC ........ *H04L 67/025* (2013.01); *G06F 3/04842* (2013.01)

(58) Field of Classification Search
  CPC ....... G11B 27/03; H04N 5/2222; H04N 5/265
  See application file for complete search history.

(56) References Cited

U.S. PATENT DOCUMENTS

| | | |
|---|---|---|
| 6,020,931 A | 2/2000 | Bilbrey et al. |
| 7,577,978 B1 | 8/2009 | Wistendahl et al. |
| 8,508,614 B2 | 8/2013 | Segal |
| 8,584,164 B2 | 11/2013 | Walter et al. |
| 8,745,657 B2 | 6/2014 | Chalozin et al. |
| 9,036,043 B2 | 5/2015 | Segal |
| 9,363,448 B2 | 6/2016 | Segal |
| 9,661,256 B2 | 5/2017 | Segal |

(Continued)

FOREIGN PATENT DOCUMENTS

| | | |
|---|---|---|
| GB | 2 502 986 | 12/2013 |
| WO | WO 2010/141939 | 12/2010 |

(Continued)

*Primary Examiner* — Huy T Nguyen
(74) *Attorney, Agent, or Firm* — Leason Ellis LLP

(57) ABSTRACT

A system and method in which a remote control application executes on a mobile computing device having a processor, a communication device, and an accelerometer and/or a gyroscope. The mobile computing device interfaces with the content provided on a display device that is separate and remote from the mobile computing device. First information is generated that represents a respective location within the display device and usable to provide a graphical representation on the display device with the content at the respective location. Movement is detected and second information representing a different respective position within the display device is generated. The second information is usable to provide the graphical representation on the display device with the content substantially at the different respective position.

18 Claims, 5 Drawing Sheets

(56) References Cited

U.S. PATENT DOCUMENTS

| | | |
|---|---|---|
| 2001/0006382 A1 | 7/2001 | Sevat |
| 2002/0186233 A1 | 12/2002 | Holtz et al. |
| 2004/0015398 A1 | 1/2004 | Hayward |
| 2005/0137958 A1 | 6/2005 | Huber et al. |
| 2005/0204438 A1* | 9/2005 | Wang ................. B25J 5/00 455/67.7 |
| 2006/0075668 A1* | 4/2006 | Sauer .................. G09F 13/00 40/546 |
| 2007/0089134 A1 | 4/2007 | Stearns |
| 2007/0266322 A1 | 11/2007 | Tretter |
| 2008/0033806 A1 | 2/2008 | Howe |
| 2008/0096175 A1 | 4/2008 | Du Toit et al. |
| 2008/0109300 A1 | 5/2008 | Bason |
| 2008/0150913 A1 | 6/2008 | Bell et al. |
| 2009/0066690 A1 | 3/2009 | Harrison |
| 2009/0153804 A1 | 6/2009 | Giraldo et al. |
| 2009/0237565 A1 | 9/2009 | Staker et al. |
| 2010/0083191 A1* | 4/2010 | Marshall ............. G06F 1/1626 715/863 |
| 2010/0174783 A1 | 7/2010 | Zarom |
| 2011/0161990 A1 | 6/2011 | Smith |
| 2011/0202827 A1 | 8/2011 | Freishtat |
| 2011/0249075 A1 | 10/2011 | Abuan et al. |
| 2011/0254912 A1 | 10/2011 | Mock et al. |
| 2011/0298935 A1 | 12/2011 | Segal |
| 2012/0158524 A1 | 6/2012 | Hintz |
| 2013/0031593 A1 | 1/2013 | Booth |
| 2013/0073985 A1 | 3/2013 | Hamlin et al. |
| 2013/0117129 A1 | 5/2013 | Brown et al. |
| 2013/0155187 A1* | 6/2013 | Skyberg ............ H04N 5/23222 348/46 |
| 2013/0173355 A1 | 7/2013 | Barcenas |
| 2013/0212615 A1 | 8/2013 | Schultz |
| 2014/0002581 A1 | 1/2014 | Bear et al. |
| 2014/0132702 A1 | 5/2014 | Leibovich et al. |
| 2014/0215542 A1 | 7/2014 | Terpe |
| 2015/0149930 A1 | 5/2015 | Walkin et al. |

FOREIGN PATENT DOCUMENTS

| | | |
|---|---|---|
| WO | WO 2012/139082 | 10/2012 |
| WO | WO 2013/076478 | 5/2013 |
| WO | WO 2013/167901 | 11/2013 |

\* cited by examiner

SYSTEM AND METHOD FOR PROVIDING AND INTERACTING WITH COORDINATED PRESENTATIONS

CROSS-REFERENCE TO RELATED APPLICATIONS

The present application is based on and claims priority to U.S. Patent Application Ser. No. 62/105,682, filed Jan. 20, 2015, and is based on and claims priority to U.S. Patent Application Ser. No. 62/242,029, filed Oct. 15, 2015, is based on and claims priority to U.S. Patent Application Ser. No. 62/209,727, filed Aug. 25, 2015; and further this application is a continuation-in-part of U.S. patent application Ser. No. 14/833,984, filed Aug. 24, 2015, and which is a continuation-in-part of U.S. patent application Ser. No. 14/316,536, filed Jun. 26, 2014, which is a continuation-in-part of U.S. patent application Ser. No. 13/938,955, filed Jul. 10, 2013, now U.S. Pat. No. 9,036,043 issued May 19, 2015, the entire contents of all of which are respectively incorporated by reference as if expressly set forth in their respective entireties herein.

Further this application incorporates by reference U.S. Patent Application Ser. No. 62/076,307, filed Nov. 6, 2014, U.S. patent application Ser. No. 14/316,536, filed Jun. 26, 2014, and U.S. Patent Application Ser. No. 62/040,970, Aug. 22, 2014, the entire contents of all of which are respectively incorporated by reference as if expressly set forth in their respective entireties herein.

FIELD

The present application relates, generally, to content presentation and, more particularly, to a system and method for providing and interacting with coordinated presentations.

BACKGROUND

For years, people have used laser pointers to interact with presentations, such as software presentations that are displayed during conferences, meetings or other public events. A laser pointer typically includes a small handheld device having a power source (e.g., a battery) and a laser diode that emits a laser beam of colored light (a "laser beam") that is usable to highlight a narrow portion of the display.

Interactive and supplemental content that has been made available to viewers has been done through a decoupled, separate communication channel. For instance, a producer can provide a separate communication channel with data, a video stream, or both at a URL associated with the broadcast. For example, a television station can have on-air programming and also provide supplemental content available through a website. Apart from sponsoring both sources of information, these communication channels are generally decoupled from one another. In other words, the broadcaster has only an indirect relationship to the viewer with regard to any supplemental content.

Further, a broadcaster, who may be an individual using a portable computer device, has been provided technology to provide viewers with the ability to launch supplemental content that has been curated by the broadcaster to the topics and information sources chosen by the broadcaster.

It is with respect to these and other considerations that the disclosure made herein is presented.

SUMMARY

In one or more implementations, the present application includes a computerized system and method that uses information generated by a mobile computing device to provide remote control interactivity with content provided on a display. A remote control application is provided to execute on a mobile computing device, the mobile computing device having at least a processor, a communication device, and at least one of an accelerometer and a gyroscope. The mobile computing device configured with the remote control application interfaces with the content provided on a display device that is separate and remotely located from the mobile computing device. Moreover, the mobile computing device configured with the remote control application generates first information representing a respective location within the display device, wherein the first information is usable to provide a graphical representation on the display device with the content substantially at the respective location. Moreover, the mobile computing device configured with the remote control application detects, while interfacing with the content, at least movement of the mobile computing device. The mobile computing device configured with the remote control application and in response to the detected movement, generates second information representing a different respective position within the display device. The second information is usable to provide the graphical representation on the display device with the content substantially at the different respective position.

In one or more implementations, the different respective position within the display device is relative to the movement of the mobile computing device. Further, the movement of the mobile computing device can be detected by at least of the accelerometer and the gyroscope. The first information and the second information are processed to provide movement of the graphical representation from the respective position to the different respective position.

In addition, the mobile computing device configured with the remote control application while interfacing with the content, can detect a selection event and generate in response to the selection event, third information representing a selection made in a graphical user interface associated with the content provided on the display device, wherein the third information is usable to make the selection in the graphical user interface. Further, at least one of the content, the graphical representation, the graphical user interface and the selection in the graphical user interface is provided by a computing device other than the mobile computing device. Alternatively or in addition, wherein at least one of the content, the graphical representation, the graphical user interface and the selection in the graphical user interface is provided by the mobile computing device.

These and other aspects, features, and advantages of the invention can be understood with reference to the following detailed description of certain embodiments of the invention taken together in conjunction with the accompanying drawings figures.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DESCRIPTION

Figure 1:
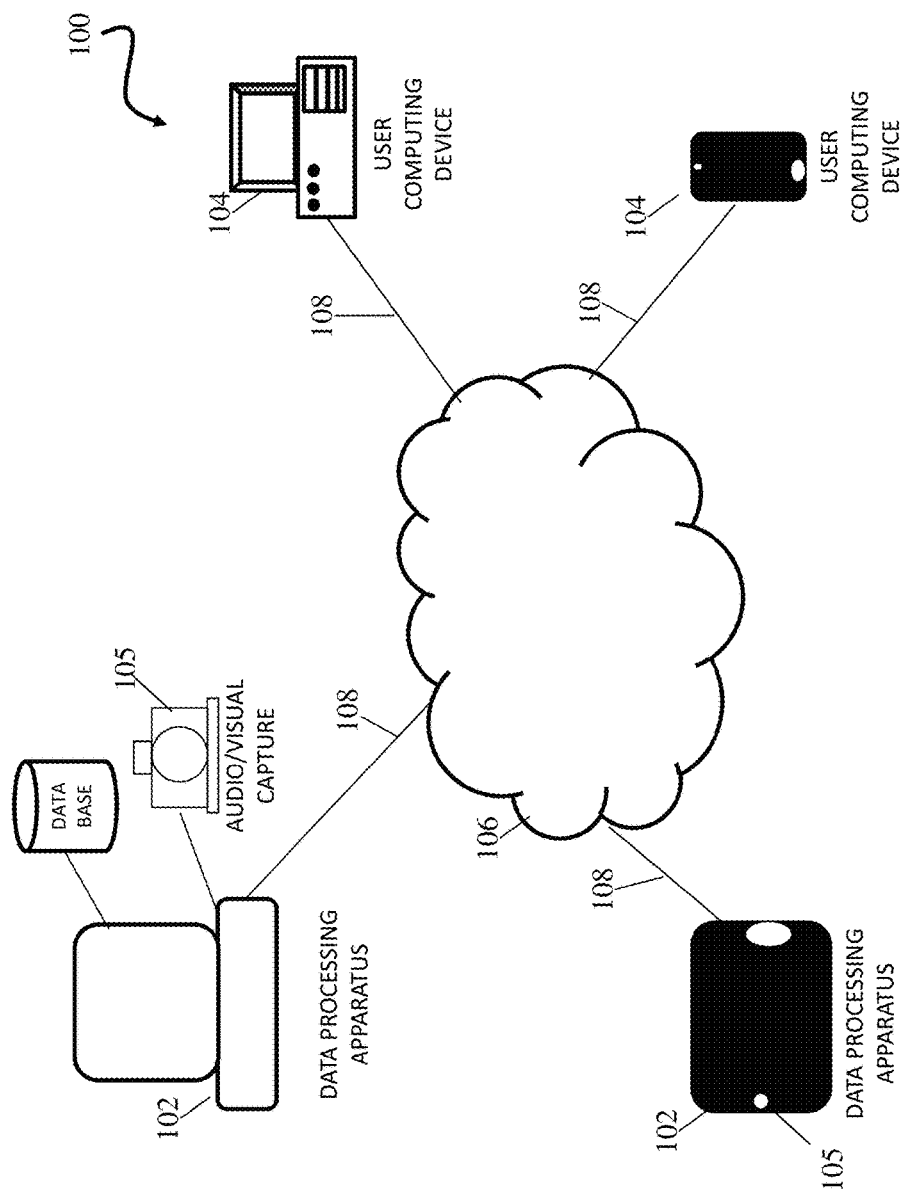
FIG. 1 is a diagram illustrating an example hardware arrangement that operates for providing the systems and methods disclosed herein.

By way of introduction and overview, in one or more implementations the present application provides systems and methods for configuring a portable computing device with one or more modules to emulate a virtual remote control device that includes functionality to simulate a laser pointer and drawing tool. This provides for improved interactivity than, for example, being physically tied to a presentation authoring or playback device. As such, a more personal and deeper experience can be had by utilizing the present application.

The present application includes one or more modules that configures a mobile computing device to simulate a laser pointer effect when presenting content in a presentation. In one or more implementations, the on-board gyroscope and/or accelerometer provided with a mobile computing device such as a smartphone can be employed to provide information representing orientation, movement and location information representing a position where laser pointer functionality effectively should appear, such as in a coordinated presentation. One or more elements within a coordinated presentation, in accordance with the present application, including in one or more vApps (substantially as shown and described in co-pending patent application Ser. No. 14/316,536), can be interacted with as a function of one or more modules executing in the mobile computing device thereby configuring the mobile computing device to simulate a laser pointer. The computing device can thus perform various laser-pointer functionality, such as to enable a user to navigate between slides, point to or identify respective portions of a display including in a coordinated presentation, make selections of one or more graphical screen controls (e.g., radio buttons, checkboxes or the like), or perform other tasks.

In one or more implementations, the present application provides for authoring and playing video that can be layered with interactive content, including content that is available over one or more data communication networks, such as the Internet. Devices operating, for example, iOS, ANDROID, WINDOWS MOBILE, BLACKBERRY, MAC OS, WINDOWS or other operating systems are configured to provide functionality, such as an authoring tool and interface for developing distributable coordinated presentations, including videos that include customizable and interactive features for use by one or more end-users that receive the videos. Further, the software applications provide a viewing/interactive tool, referred to herein, generally, as a "consuming" interface for end-users who receive videos that are authored in accordance with the present application. Using the client interface, users may interact with videos as a function of touch and gestures, as well as other suitable interfaces, such as provided via an application that configures a smartphone or other mobile computing device to simulate a laser pointer, drawing tool, mouse, trackball, keyboard or other input device.

Accordingly, the present application includes and improves upon functionality associated with providing video content and other content in respective separately and independently controllable portions of a display screen. For example, the present application provides content in a content unit set forth in a first portion of a display, whereby the content is received from a first computing device. In one or more implementations, an independently controllable display unit can be provided in a second separate portion of the display. The display unit can be configured to include interactive media content and further configured to enable interaction with the interactive media content at each of a plurality of remote devices. Results of a respective interaction at a particular remote device can be viewable or otherwise presented at the particular remote device, but not viewable or otherwise presented at other of the remote devices.

In one or more implementations of the present patent application, a processor configured with code processes information representing a selection event that occurred in a mobile computing device, corresponding to content provided in the display unit. For example, a user makes a selection in a remote control software application operating on his or her mobile computing device (e.g., iPhone) and corresponding to a portion of the display unit while the interactive media content in the display unit is provided therein. The processing that occurs can be used to determine at least a relative time and location of the selection event that occurred in the second portion of the display. The information representing the selection event can be stored in one or more databases that are accessible to at least one computing device. The selection of an item can be processed to enable the interaction with at least a portion of the interactive media content at one of the remote devices associated with the selection event. This enables results of a respective interaction associated with the selection event to be viewable or otherwise provided at one particular remote device, but not viewable or otherwise provided at other of the remote devices.

Referring to FIG. 1 a diagram is provided of an example hardware arrangement that operates for providing the systems and methods disclosed herein, and designated generally as system 100. System 100 can include one or more data processing apparatuses 102 that are at least communicatively coupled to one or more user computing devices 104 across communication network 106. Data processing apparatuses 102 and user computing devices 104 can include, for example, mobile computing devices such as tablet computing devices, smartphones, personal digital assistants or the like, as well as laptop computers and/or desktop computers. Further, one computing device may be configured as a data processing apparatus 102 and a user computing device 104, depending upon operations be executed at a particular time. In addition, an audio/visual capture device 105 is depicted in FIG. 1, which can be configured with one or more cameras (e.g., front-facing and rear-facing cameras), a microphone, a microprocessor, and a communications module(s) and that is coupled to data processing apparatus 102. The audio/visual capture device 105 can be configured to interface with one or more data processing apparatuses 102 for producing high-quality audio/video content.

With continued reference to FIG. 1, data processing apparatus 102 can be configured to access one or more databases for the present application, including image files, video content, documents, audio/video recordings, metadata and other information. However, it is contemplated that data processing apparatus 102 can access any required databases via communication network 106 or any other communication network to which data processing apparatus 102 has access. Data processing apparatus 102 can communicate with devices comprising databases using any known communication method, including a direct serial, parallel, universal serial bus ("USB") interface, or via a local or wide area network.

User computing devices 104 communicate with data processing apparatuses 102 using data connections 108, which are respectively coupled to communication network 106. Communication network 106 can be any communication network, but is typically the Internet or some other global computer network. Data connections 108 can be any known arrangement for accessing communication network 106, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, software applications, or other means, to provide received data on display devices incorporated therewith. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and data processing apparatuses 102. In one or more implementations, the present application provides improved processing techniques to prevent packet loss, to improve handling interruptions in communications, and other issues associated with wireless technology.

According to an embodiment of the present application, user computing device 104 provides user access to data processing apparatus 102 for the purpose of receiving and providing information. The specific functionality provided by system 100, and in particular data processing apparatuses 102, is described in detail below.

System 100 preferably includes software that provides functionality described in greater detail herein, and preferably resides on one or more data processing apparatuses 102 and/or user computing devices 104. One of the functions performed by data processing apparatus 102 is that of operating as a web server and/or a web site host. Data processing apparatuses 102 typically communicate with communication network 106 across a permanent i.e., un-switched data connection 108. Permanent connectivity ensures that access to data processing apparatuses 102 is always available.

Figure 2:
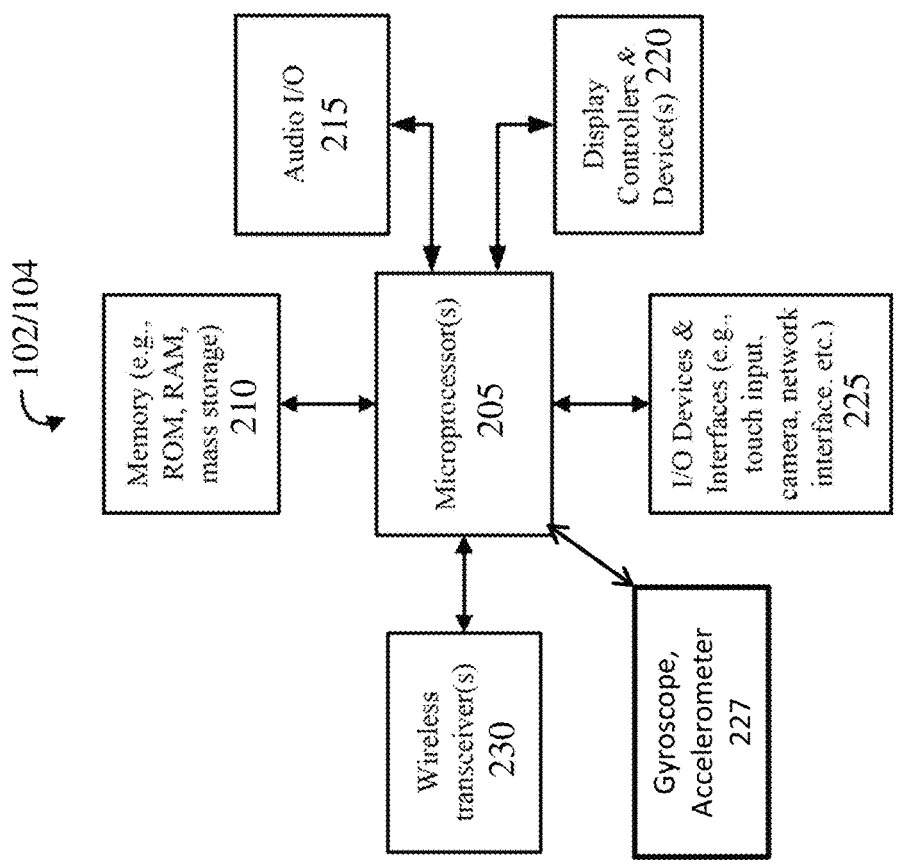
FIG. 2 is a block diagram that illustrates functional elements of a computing device in accordance with an embodiment.

FIG. 2 illustrates, in block diagram form, an exemplary data processing apparatus 102 and/or user computing device 104 that can provide various functionality, as shown and described herein. Although not expressly indicated, one or more features shown and described with reference with FIG. 2 can be included with or in the audio/visual capture device 105, as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type. The data processing apparatus 102 and/or user computing device 104 also includes an audio input/output subsystem 215 which may include one or more microphones and/or speakers.

A display controller and display device 220 provides a visual user interface for the user; this user interface may include a graphical user interface which, for example, is similar to that shown on a Macintosh computer when running Mac OS operating system software or an iPad, iPhone, or similar device when running iOS operating system software.

The data processing apparatus 102 and/or user computing device 104 also includes one or more wireless transceivers 230, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network. In addition, Gyroscope/Accelerometer 235 can be provided. It will be appreciated that one or more buses, may be used to interconnect the various modules in the block diagram shown in FIG. 2.

The data processing apparatus 102 and/or user computing device 104 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing apparatus 102 and/or user computing device 104 may be a network computer or an embedded processing apparatus within another device or consumer electronic product.

The data processing apparatus 102 and/or user computing device 104 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 102 and/or user computing device 104. The I/O devices and interfaces 225 may include a connector for a dock or a connector for a USB interface, FireWire, etc. to connect the system 100 with another device, external component, or a network. Moreover, the I/O devices and interfaces can include gyroscope and/or accelerometer 227, which can be configured to detect 3-axis angular acceleration around the X, Y and Z axes, enabling precise calculation, for example, of yaw, pitch, and roll. The gyroscope and/or accelerometer 227 can be configured as a sensor that detects acceleration, shake, vibration shock, or fall of a device 102/104, for example, by detecting linear acceleration along one of three axes (X, Y and Z). The gyroscope can work in conjunction with the accelerometer, to provide detailed and precise information about the device's axial movement in space. More particularly, the 3 axes of the gyroscope combined with the 3 axes of the accelerometer enable the device to recognize approximately how far, fast, and in which direction it has moved to generate telemetry information associated therewith, and that is processed to generate coordinated presentations, such as shown and described herein.

It will be appreciated that additional components, not shown, may also be part of the data processing apparatus 102 and/or user computing device 104, and, in certain embodiments, fewer components than that shown in FIG. 2 may also be used in data processing apparatus 102 and/or user computing device 104. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 210 or other machine-readable storage medium. The software may further be transmitted or received over a network (not shown) via a network interface device 225. In various embodiments, hardwired circuitry may be used in combination with the software instructions to implement the present embodiments. Thus, the techniques are not limited to any specific combination of hardware circuitry and software, or to any particular source for the instructions executed by the data processing apparatus 102 and/or user computing device 104.

Figure 3A:
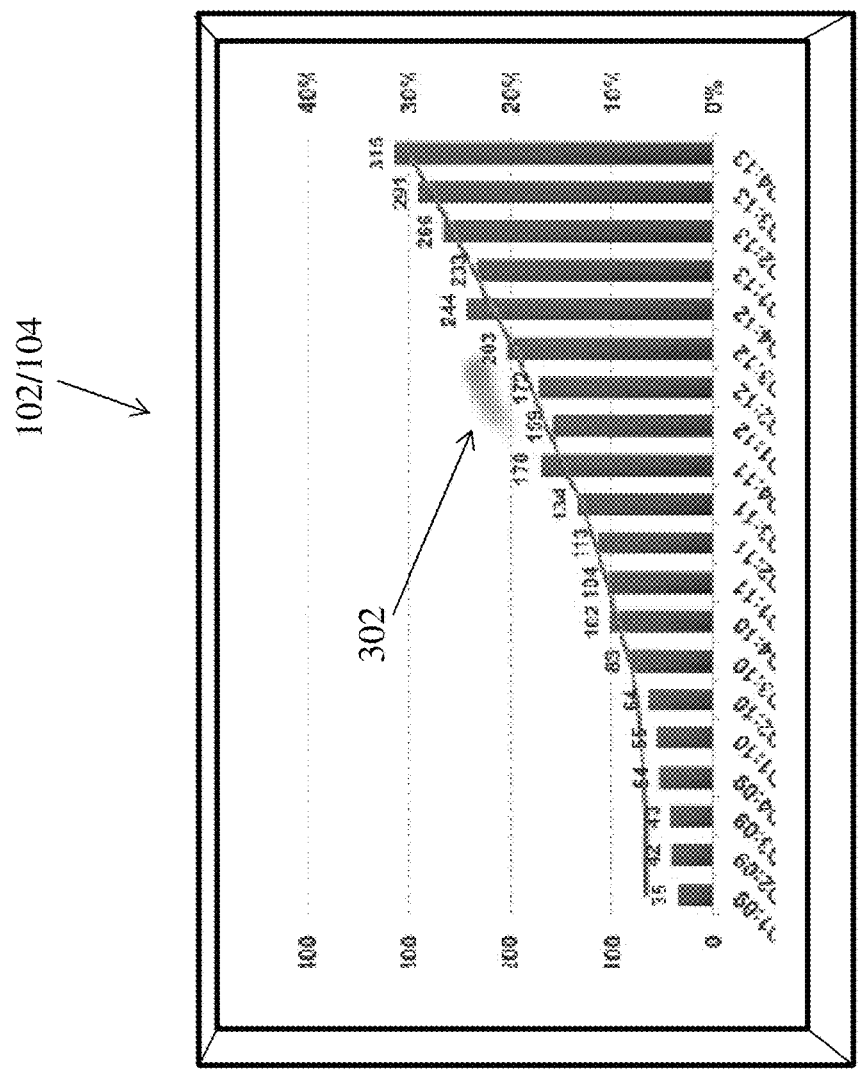
FIGS. 3A and 3B illustrate an example coordinated presentation and interactivity provided by a simulated laser pointer and drawing tool, in accordance with an implementation.

For example, and as shown in FIG. 3A, a pointer 302 can be provided in response to a selection on a mobile computing device graphical user interface, including to point to a specific area in a display (e.g., a graph). The pointer can be moved around the screen as a function of the gyroscope within the mobile computing device.

Figure 3B:
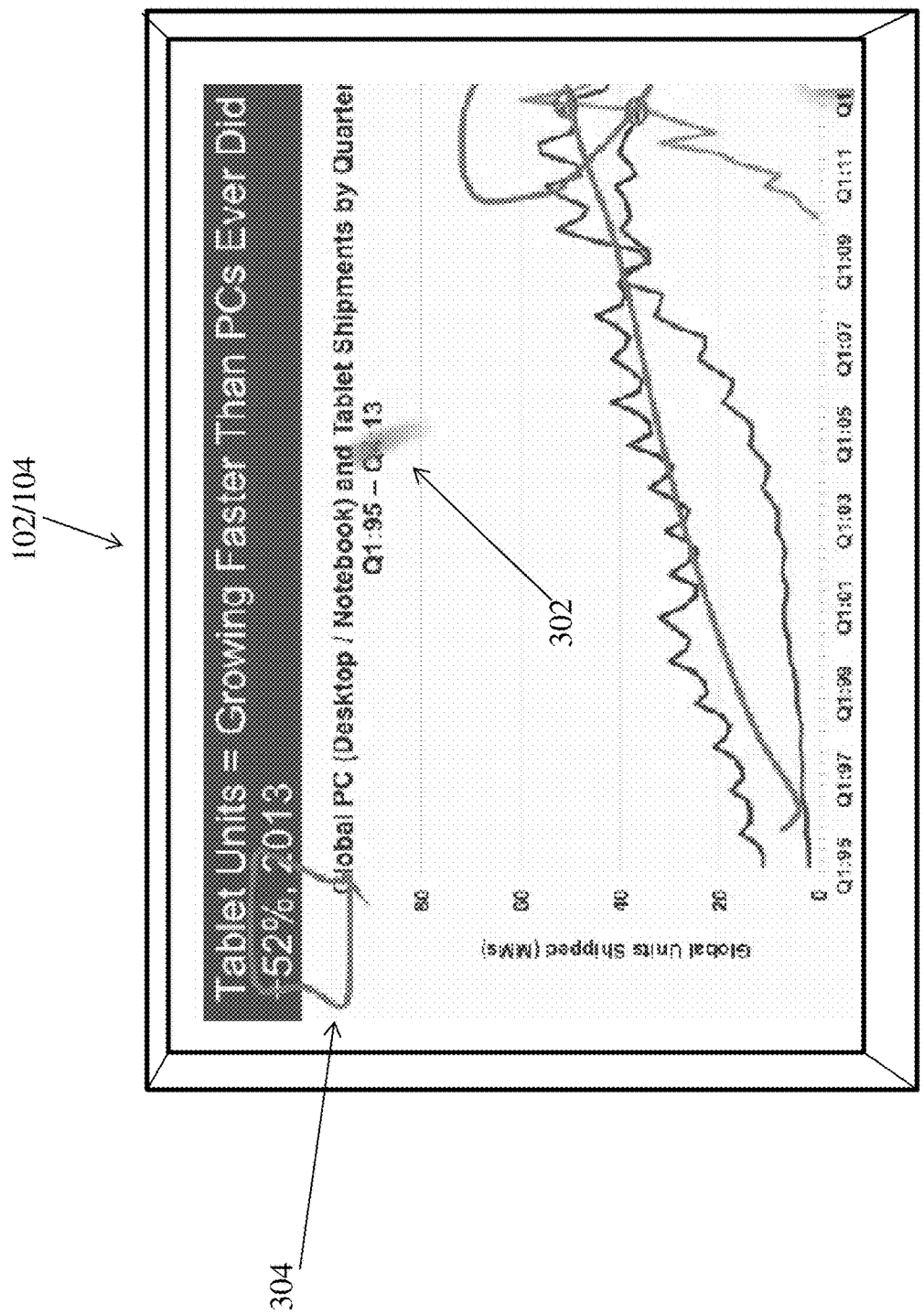

Other functionality provided in accordance with the simulator includes drawing functionality 304 (FIG. 3B), and providing other functionality that results in an effective tool for explaining and highlighting features within a coordinated presentation, both during the authoring and playback associated therewith. This is provided for authors and/or viewers who are physically positioned away from a coordinated presentation authoring tool (e.g. an iPad), such as by using smartphone.

In one or more implementations, a mobile computing device is configured with a software application that configures the mobile device to simulate a remote control, laser device and/or annotation and drawing tool. Various vApps that are included in a respective coordinated presentation can be manipulated (including pointed at) by an author using the remote control. This enables an author to be decoupled from the respective authoring platform, such as the iPad or other tablet computer that is being used to author a coordinated presentation, by using a simulated remote control, for example, across the room. In operation, for example, content that is curated, e.g., queued for inclusion in a coordinated presentation, can be selected simply by pressing an option in a graphical user interface provided on the mobile computing device operating as the remote control. Interactive elements, e.g., vApps can be embedded in the presentation simply by the authors selecting of an option to include the element(s) in the remote control software app. The author can add and/or remove interactive elements by selecting options in the remote control app operating on the mobile computing device, which effectively frees the author from being tied to the authoring tool (e.g., the iPad).

Similarly, users or viewers of a coordinated presentation can use the remote control, pointing and annotation functionality, including on their respective mobile computing devices (e.g., smartphones) to interact with coordinated presentations. For example, a viewer of a coordinated presentation can select a vApp during playback to be presented with the content therein, and thereafter highlight, draw on or perform other interactive functionality using the simulated remote control.

Thus, using the accelerometer and/or gyroscope in the smartphone or other mobile computing device, a virtual pointer, and annotating tool or other selection tool in a coordinated presentation can be remotely controlled. In this way, a smartphone or other mobile computing devices effectively doubles as a mouse, selection device, drawing tool or other interactive device. Unlike infrared or wired connection, the mobile computing device and coordinated presentation authoring/playback device preferably communicate over Wi-Fi. The remote can ask the "master" device via Wi-Fi or other protocol, such as Bluetooth, for permission to connect therewith. The telematics of the mobile computing device, such as an accelerometer and/or gyroscope, is employed over a digital IP connection to transmit to the presentation authoring and/or playback software, which in turn functions to control a simulated laser red dot, drawing tool or other functionality, which can be configured as a core function of the presentation authoring and/or playback application.

Figure 4:
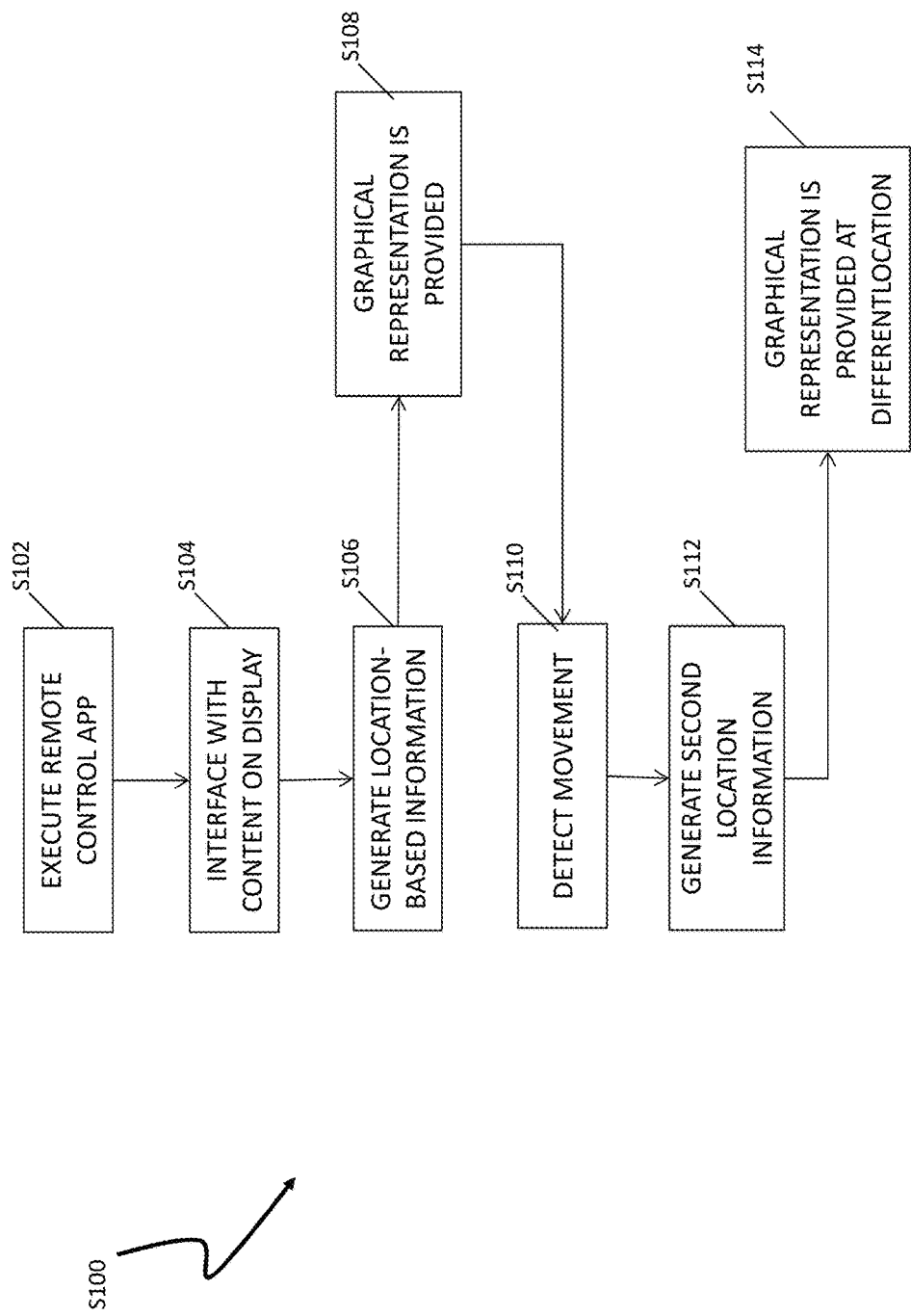
FIG. 4 is a flowchart illustrating example steps that are associated with an implementation of the present application.

FIG. 4 is a flowchart illustrating example steps S100 that are associated with an implementation of the present application. It should be appreciated that several of the logical operations described herein can be implemented (1) as a sequence of computer implemented acts or program modules running on a communication device and/or (2) as interconnected machine logic circuits or circuit modules within a communication device. The implementation is a matter of choice dependent on the requirements of the device (e.g., size, energy, consumption, performance, etc.). Accordingly, the operations described herein are referred to variously as operations, structural devices, acts, and/or modules. Various of these operations, structural devices, acts and modules can be implemented in software, firmware, special-purpose digital logic, and any combination thereof. It should also be appreciated that more or fewer operations can be performed than those in the figures described herein. These operations can also be performed in a different order than as described herein.

In the example steps shown in FIG. 4, the process S100 is associated with a computerized system and method that uses information generated by a mobile computing device to provide remote control interactivity with content provided on a display. A remote control application is provided to execute on a mobile computing device, the mobile computing device having at least a processor, a communication device, and at least one of an accelerometer and a gyroscope (step S102). The mobile computing device configured with the remote control application interfaces with the content provided on a display device that is separate and remotely located from the mobile computing device (step S104). Moreover, the mobile computing device configured with the remote control application generates first information representing a respective location within the display device (step S106). The first information is usable to provide a graphical representation on the display device with the content substantially at the respective location (step S108). Moreover, the mobile computing device configured with the remote control application detects, while interfacing with the content, at least movement of the mobile computing device (step S110). In response, the mobile computing device configured with the remote control application and in response to the detected movement, generates second information representing a different respective position within the display device (step S112). The second information is usable to provide the graphical representation on the display device with the content substantially at the different respective position (step S114). Thereafter, the process ends (not shown).

In this way, a new form of remote control is provided by pairing a mobile computing device, such as a smartphone, with an authoring tool device, a display device, or other presentation device. Various functionality provided in connection with coordinated presentations, such as controlling teleprompters (e.g., speed), green screen functionality, whiteboard functionality, titles, interactive Web-based content, or the like, can be selected and controlled vis-à-vis the remote control in connection with the present application. As shown and described herein, the present application further provides for simulating laser pointer control, annotation and drawing devices, such as for controlling publicly viewed or accessible displays. In addition to controlling a privately viewed coordinated presentation, the present application is also useful for public speaking or other public presentation activities. Thus, in addition to remote control functionality, the present application supports simulation of a laser pointer, annotation and drawing tool.

The present application enables control of one device, such as an iPad or other tablet computer with another mobile computing device, such as a smartphone, over a Wi-Fi or other network connection. Once the devices are paired, such as using Wi-Fi, Bluetooth or other suitable communications, the remote control can be used for various selecting functionality and providing various drawing and other (e.g., video and/or audio) forms of annotation and inclusion. As will become evident to one of ordinary skill, the present application provides significant flexibility and creativity in connection with creating and viewing coordinated presentations.

Although many of the examples shown and described herein regard distribution of coordinated presentations to a plurality of users, the invention is not so limited. Although illustrated embodiments of the present invention have been shown and described, it should be understood that various changes, substitutions, and alterations can be made by one of ordinary skill in the art without departing from the scope of the present invention.

What is claimed is:

1. A computerized method that uses information generated by a mobile computing device to simulate a projected, movable laser beam that interacts with content provided on a separate computing device, the method comprising:

providing a remote control software application to execute on the mobile computing device, the mobile computing device having at least a processor, non-transitory processor readable media on which the remote control software application is stored, a communication device, and at least one of an accelerometer and a gyroscope;

interfacing, with the separate computing device using the communication device of the mobile computing device, as the mobile device is configured by executing the remote control software application;

generating, by the mobile computing device configured by executing the remote control software application, first information representing at least one of orientation, movement and location, wherein the first information is usable by the separate computing device to provide a graphical representation of the simulated, movable laser beam within the content substantially at a respective location within a display device configured with the separate computing device;

detecting, by the mobile computing device configured by executing the remote control software application while interfacing with the separate computing device, at least movement of the mobile computing device; and generating, by the mobile computing device configured by executing the remote control software application in response to the detected movement, second information representing a different at least one of orientation, movement and location, wherein the second information is usable by the separate computing device to provide the graphical representation of the simulated, movable laser beam at a different location corresponding within the display device with the separate computing device.

2. The method of claim 1, wherein the different location is relative to the movement of the mobile computing device.

3. The method of claim 1, wherein the movement of the mobile computing device is detected by at least one of the accelerometer and the gyroscope.

4. The method of claim 1, wherein the first information and the second information are processed to provide movement of the graphical representation of the simulated, movable laser beam.

5. The method of claim 1, further comprising:

detecting, by the mobile computing device configured with the remote control software application while interfacing with the separate computing device, a selection event;

generating, by the mobile computing device configured with the remote control software application in response to the selection event, third information representing a selection made in a graphical user interface associated with the content provided on the display device, wherein the third information is usable to make the selection in the graphical user interface.

6. The method of claim 5, wherein at least one of the content, the graphical representation, the graphical user interface and the selection in the graphical user interface is provided by a computing device other than the mobile computing device.

7. The method of claim 5, wherein at least one of the content, the graphical representation, the graphical user interface and the selection in the graphical user interface is provided by the mobile computing device.

8. The method of claim 1, wherein at least one of the content and the graphical representation is provided by a computing device other the mobile computing device.

9. The method of claim 1, wherein at least one of the content and the graphical representation is provided by the mobile computing device.

10. A computerized system that uses information generated by a mobile computing device to simulate a projected, movable laser beam that interacts with content provided on a separate computing device, the system comprising:
- a mobile computing device having at least a processor, non-transitory processor readable media on which a remote control software application is stored, a communication device, and at least one of an accelerometer and a gyroscope;
- wherein the mobile computing device, when executing the remote control application, is configured to:
    - interface with the separate computing device using the communication device of the mobile computing device, as the mobile device is configured by executing the remote control software application;
    - generate first information representing at least one of orientation, movement and location, wherein the first information is usable by the separate computing device to provide a graphical representation of the simulated, movable laser beam within the content substantially at a respective location within a display device configured with the separate computing device;
    - detect, while interfacing with the separate computing device, at least movement of the mobile computing device; and
    - generate, in response to the detected movement, second information representing a different at least one of orientation, movement and location, wherein the second information is usable by the separate computing device to provide the graphical representation of the simulated, movable laser beam at a different location corresponding within the display device with the separate computing device.

11. The system of claim 10, wherein the different location is relative to the movement of the mobile computing device.

12. The system of claim 10, wherein the movement of the mobile computing device is detected by at least one of the accelerometer and the gyroscope.

13. The system of claim 10, wherein the first information and the second information are processed to provide movement of the graphical representation of the simulated, movable laser beam.

14. The system of claim 10, wherein the mobile computing device, when executing the remote control application, is further configured to:
- detect, while interfacing with the separate computing device, a selection event;
- generate, in response to the selection event, third information representing a selection made in a graphical user interface associated with the content provided on the display device, wherein the third information is usable to make the selection in the graphical user interface.

15. The system of claim 14, wherein at least one of the content, the graphical representation, the graphical user interface and the selection in the graphical user interface is provided by a computing device other than the mobile computing device.

16. The system of claim 14, wherein at least one of the content, the graphical representation, the graphical user interface and the selection in the graphical user interface is provided by the mobile computing device.

17. The system of claim 10, wherein at least one of the content and the graphical representation is provided by a computing device other the mobile computing device.

18. The system of claim 10, wherein at least one of the content and the graphical representation is provided by the mobile computing device.

\* \* \* \* \*